Sept. 11, 1951  R. W. LARSON  2,567,718
TAPERED CORRUGATED LINE
Filed Sept. 24, 1945
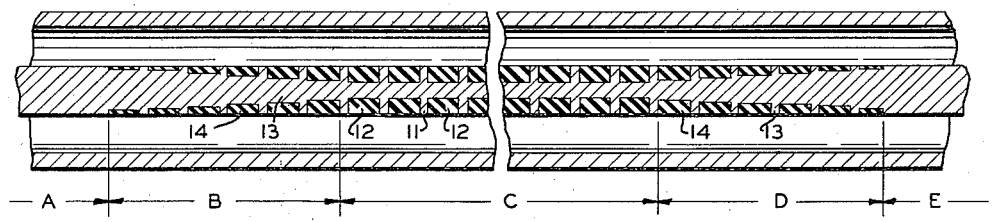
INVENTOR
ROLAND W. LARSON
BY
ATTORNEY

UNITED STATES PATENT OFFICE 2,567,718

TAPERED CORRUGATED LINE

Roland W. Larson, Marshfield, Wis., assignor, by mesne assignments, to the United States of America as represented by the Secretary of the Navy Application September 24, 1945, Serial No. 618,360

11 Claims. (Cl. 178—44)

This invention relates to impedance matching devices, which are particularly useful in matching a corrugated wave guide to a smooth wave guide of conventional type.

In the patent application Serial No. 504,777 filed October 2, 1943, of Milton G. White are disclosed various embodiments of corrugated wave guides and also in Fig. 7 the matching device of the instant invention. Corrugated wave guides have the characteristic of shortening the wave length of the energy passing therethrough without changing the frequency. In securing the shortening effect, it is often necessary to couple the corrugated wave guide to a smooth wave guide of the same general form. The characteristic impedance of a corrugated wave guide corresponds approximately to the characteristic impedance of a smooth wave guide of approximately the same average cross section as the corrugated wave guide. Consequently, when a portion of smooth wave guide is to be coupled for maximum energy transfer to a portion of corrugated wave guide, there should be little or no change in the average cross section, or else some form of impedance-matching device should be employed.

It is accordingly an object of this invention to provide an impedance matching device.

It is a further object of this invention to provide a device for matching a corrugated wave guide to a smooth wave guide.

It is a further object of this invention to provide a device for matching a corrugated wave guide to a smooth wave guide without disturbing the mechanical continuity of the respective wave guides.

It is a further object of this invention to provide a device for matching a corrugated wave guide to a smooth wave guide which may be an integral part of the respective wave guides.

Other and further objects will appear during the course of the following description taken in conjunction with the accompanying drawing which is a fragmentary longitudinal sectional view of an embodiment of the invention.

In the drawing, a corrugated wave guide C of the coaxial type is electrically connected at its ends to smooth wave guides A and E of similar type. Corrugated wave guide C is shown as having axially spaced annular grooves 12 on the inner conductor 11. These grooves may have the same dimensions and axial spacing as the grooves in the corresponding embodiment in the above identified application. It is sufficient to point out here that the number of grooves per wave length in the guide should preferably be 10 to 12, and in any case where a reasonable power transfer is desired the number per wave length in the guide should not be less than two. Since inner conductor 11 of the corrugated wave guide C has a smaller average cross sectional area than the corresponding conductor of smooth wave guides A and E, a mismatch with resulting standing waves would occur, if the wave guide C were directly connected to A and E. To overcome this, matching devices B and D are provided between the adjacent ends of the respective guides, and comprise each a section of wave guide similar in type to those they join. The matching devices are preferably integral with the adjoining wave guides, but may be separate therefrom and be held in abutting relation to provide a smooth mechanical and good electrical junction. Inner conductor 13 of each matching device B and D is provided with axially spaced grooves 14, preferably of the same width and spacing as grooves 12 in the corrugated wave guide. The axial spacing between adjacent grooves is preferably somewhat less than the width of the grooves, and the number of grooves per wave length in the matching section as in wave guide C should be preferably 10 to 12, and in any event not less than 2 for any reasonable energy transfer. However, the depth of grooves 14 progressively increases from a minimum adjacent the smooth wave guide to a maximum adjacent the corrugated wave guide. This maximum depth is substantially the depth of the grooves in the corrugated wave guide. This results in a tapering depth of the grooves along the axis of the matching device. This tapering should extend over a length of at least one wave length and preferably several, since better results are obtained with a more gradual taper. The effect of the grooves 12 and 14 is increased by filling them with a dielectric such as polystyrene. Filling the grooves with a dielectric has the additional advantage of increasing the rigidity of the inner conductor, thus permitting more of the inner conductor to be cut away without loss of rigidity. This matching device would be equally effective in matching a smooth wave guide to a corrugated one having the corrugations on the inner surface of the outer conductor, or with the inner conductor removed. Obviously, here the grooves of progressively increasing depth would be on the inner surface of the outer conductor of the matching device.

The scope of the invention is defined in the appended claims.

I claim:

1. An impedance matching section adapted to efficiently convey high frequency electromagnetic wave energy comprising, an inner and an outer conductor, one of said conductors having a plurality of axially spaced annular grooves of progressively increasing depth, the number of said grooves per wave length in the matching section being greater than two, the depth of said grooves being small compared to a wave length and said grooves being filled with dielectric material.

2. An impedance matching section adapted to efficiently convey high frequency electromagnetic wave energy comprising a hollow cylindrical outer conductor and a cylindrical inner conductor coaxially disposed within said outer conductor, said inner conductor having a plurality of axially spaced annular grooves of progressively increasing depth.

3. A two-conductor impedance matching section adapted to efficiently convey high frequency electromagnetic wave energy comprising a hollow cylindrical outer conductor and a cylindrical inner conductor coaxially disposed within said outer conductor, said inner conductor having a plurality of axially spaced annular grooves of progressively increasing depth, said grooves being filled with a solid dielectric material.

4. An impedance matching section adapted to efficiently convey high frequency electromagnetic wave energy comprising a hollow cylindrical outer conductor and a cylindrical inner conductor having a plurality of axially spaced annular grooves of progressively increasing depth, the longitudinal and depth dimensions of said grooves being small compared to the wave length of the energy to be passed by said matching section.

5. Apparatus as in claim 4 wherein said grooves are filled with solid dielectric material.

6. In an electromagnetic energy transmission system including a section of smooth wave guide having an inner and outer conductor and a section of corrugated wave guide having an inner and an outer conductor, a matching section adapted to efficiently convey high frequency electromagnetic wave energy connecting said two wave guide sections comprising an inner and an outer conductor, one of said conductors of said matching section having a plurality of axially spaced annular grooves of progressively increasing depth, said grooves being filled with dielectric material.

7. In an electromagnetic energy transmission system including a smooth wave guide having an inner and an outer conductor, and a corrugated wave guide having an inner and an outer conductor, an impedance matching section adapted to efficiently convey high frequency electromagnetic wave energy comprising an outer conductor connecting said outer conductors of said two wave guides, an inner conductor joining the inner conductors of said two wave guides, the inner conductor of said matching section having a plurality of axially spaced grooves of progressively increasing depth.

8. An impedance matching section adapted to efficiently convey high frequency electromagnetic wave energy comprising, a hollow cylindrical outer conductor, and a cylindrical inner conductor, one of said conductors having a plurality of axially spaced annular grooves of progressively increasing depth, the longitudinal and depth dimensions of said grooves being small compared to the wave length of the energy to be conveyed by said matching section.

9. An impedance matching section adapted to efficiently convey high frequency electromagnetic wave energy comprising, a hollow cylindrical outer conductor and a cylindrical inner conductor, one of said conductors having a plurality of axially spaced grooves of rectangular cross section and of progressively increasing depth, the longitudinal and depth dimensions of said grooves being small compared to the wave length of the energy to be conveyed by said matching section.

10. An impedance matching section adapted to efficiently convey high frequency electromagnetic wave energy comprising, a hollow cylindrical outer conductor and a cylindrical inner conductor, one of said conductors having a plurality of axially spaced, annular grooves of progressively increasing depth, each of said grooves being completely defined by first and second cylindrical surfaces, each concentric with the conductor in which said grooves are formed, and first and second planes perpendicular to the axis of said conductor in which said grooves are formed, the longitudinal and depth dimensions of said grooves being small compared to the wave length of the energy to be conveyed by said matching section.

11. In an electromagnetic energy transmission system including a section of smooth wave guide having an inner and an outer conductor and a section of corrugated wave guide having an inner and an outer conductor, a matching section adapted to efficiently convey high frequency electromagnetic wave energy connecting said two wave guide sections comprising, a hollow cylindrical outer conductor and a cylindrical inner conductor, one of said conductors of said matching section being formed with a plurality of axially spaced, annular grooves of progressively increasing depth, each of said grooves being completely defined by first and second cylindrical surfaces, each concentric with the conductor in which said grooves are formed and first and second planes perpendicular to the axis of said conductor in which said grooves are formed, the longitudinal and depth dimensions of said grooves being small compared to the wave length of the energy to be conveyed by said matching section.

ROLAND W. LARSON.

REFERENCES CITED

The following references are of record in the file of this patent:

UNITED STATES PATENTS

| Number | Name | Date |
|---|---|---|
| 2,139,055 | Wright | Dec. 6, 1938 |
| 2,294,881 | Alford | Sept. 8, 1942 |
| 2,343,475 | Von Baeyer | Mar. 7, 1944 |
| 2,395,560 | Llewellyn | Feb. 26, 1946 |
| 2,433,368 | Johnson | Dec. 30, 1947 |